G. A. LYON.
AUTOMOBILE BUFFER ATTACHER.
APPLICATION FILED OCT. 20, 1921.
1,418,946.
Patented June 6, 1922.
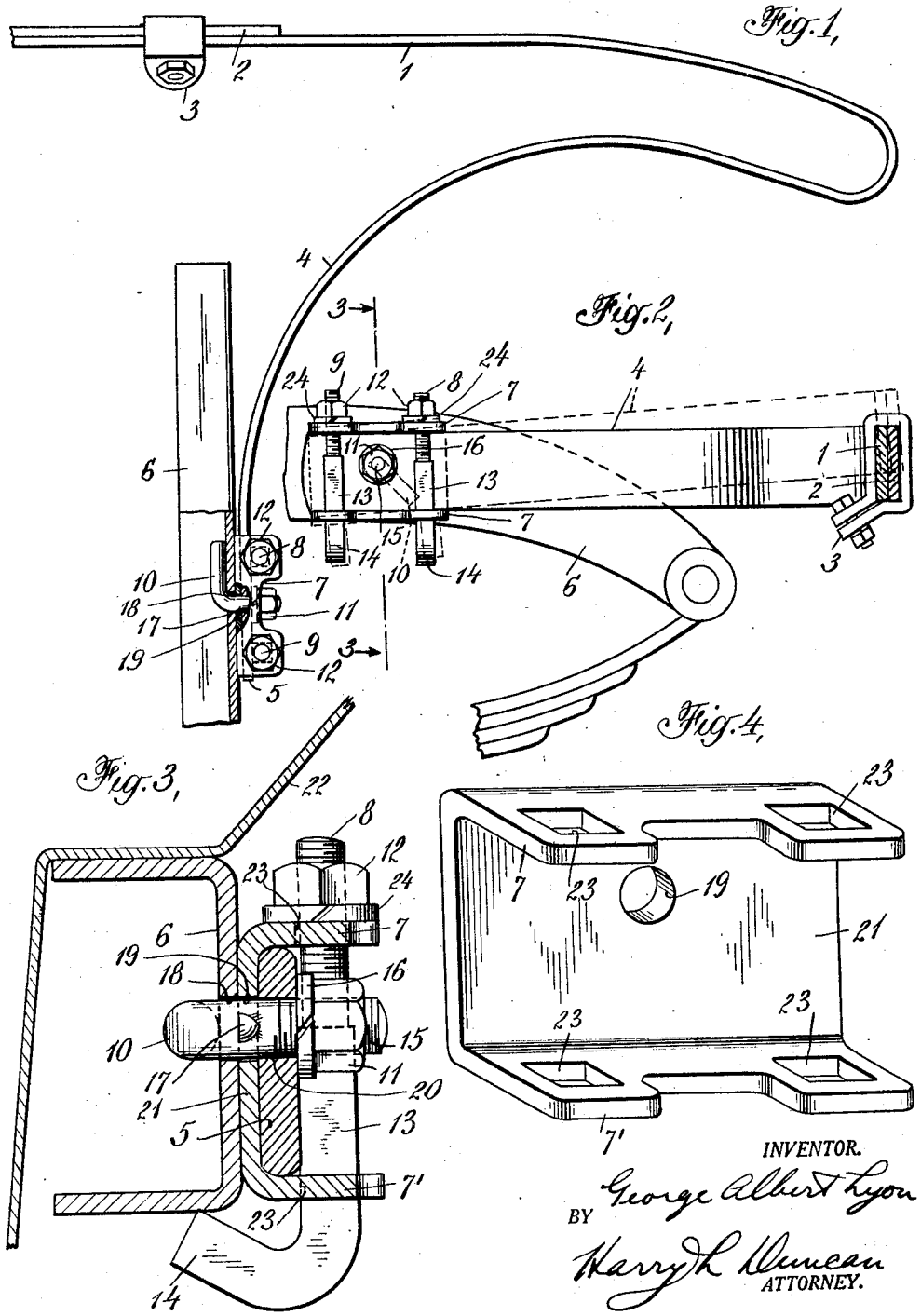

UNITED STATES PATENT OFFICE.

GEORGE ALBERT LYON, OF PHILADELPHIA, PENNSYLVANIA.

AUTOMOBILE BUFFER ATTACHER.

1,418,946. Specification of Letters Patent. Patented June 6, 1922.

Application filed October 20, 1921. Serial No. 509,054.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Automobile Buffer Attachers, of which the following is a specification, taken in connection with the accompanying drawing.

This invention relates especially to attaching devices for securing various types of buffers or bumpers to automobiles or other vehicles and in which a contact bracket or plate member may be bolted or otherwise adjustably connected to the automobile frame members as by swivelingly bolting this contact bracket to the frame web for which purpose an angle bolt attacher of the type covered by the Lyon Patent, 1,358,687, of November 9, 1920, may be used. A single attacher bolt of this or other type may pass through the frame web and contact bracket and may also pass through a round hole or aperture in the end of the supporting bar or member of the automobile buffer which may be of spring strip construction so that this supporting member may be relatively thin and rigid and thus involve a minimum lateral projection outside of the frame web. The contact bracket which may be efficiently formed of stamped up sheet steel or other material, may have one or more attaching holes or slots through which the attacher bolt may extend and preferably has bent up lugs or flanges to substantially engage one or both sides of the buffer supporting member to promote alignment thereof. Adjusting holding bolts may be vertically arranged to hold the contact bracket and supporting member in the desired angular position and these are preferably passed through non-circular or other apertures in the lugs or flanges of the contact bracket so that the hook ends or other projecting portions of these holding bolts may be drawn into aligning engagement with the adjacent frame member, preferably engaging the flange adjacent the frame web where stiff and rigid contact is ensured. It is in many cases advantageous to have the apertures through which these holding bolts pass so positioned that the bolts are in substantial lateral engagement with the automobile supporting member, at least when the bolts have been tightened so that their resilient body portions are bent inward somewhat against the outer exposed face of the supporting member. It is also in many cases desirable to have one or more of the bracket flanges or lugs arranged obliquely so that it is opened out somewhat from its right angle position with respect to the thin, flat contact plate. Thus when the nut on the corresponding holding bolt is tightened against this flange or lug it may be bent down into gripping holding engagement with the buffer supporting member within the flanges.

In the accompanying drawing showing in a somewhat diagrammatic way an illustrative embodiment of this invention Fig. 1 is a partial plan view of the buffer front and co-operating attaching devices.

Fig. 2 is a side elevation thereof.

Fig. 3 is an enlarged section thereof taken substantially along the line 3—3 of Fig. 2, and Fig. 4 is an enlarged perspective view of the contact bracket.

The automobile or vehicle buffer or bumper may be of any suitable or desired construction and preferably comprises a buffer front of spring steel strips 1 and 2 which may be advantageously connected by clamping members such as 3 and resilient loops may be arranged at each end of the buffer and connected in any suitable way with the attaching strips or buffer supporting members 4 which may have their ends 5 formed with one or more holes or slots 20. The automobile frame members 6 of channel iron construction may be formed with one or more holes 18 adjacent the front ends of these frame members in the case of a front buffer, or adjacent the rear ends of the frame members for attaching a rear buffer thereto. The front ends of these frame members or goose necks may have attached thereto the usual mud guards 22 and splash pan members as indicated diagrammatically in Fig. 3, so that only the lower frame flange and web are exposed. An attaching bolt or device such as the angle bolt attacher 10 may be slipped through this hole or frame aperture 18 and then turned into its holding position so that the aligning stem 15 of the bolt extends substantially perpendicularly to the frame web, the retainer 17 being, if desired, formed on the bolt stem to prevent excessive insertion into the frame aperture. The contact plate or bracket 21 may then be slipped over the bolt stem which may pass through the hole 19 therein and then the apertured or slotted end 5 of the buffer supporting member may be slipped over the stem of this angle bolt and all these members bolted against the frame web by any suitable tightening means such as the nut 11 and lock washer 16, if desired.

It is advantageous to have the contact plate or bracket angularly adjustable with respect to the frame member and for this purpose the swiveling connection which may be secured by a single attacher bolt is desirable, any other bolts or fastening devices which pass through the contact plate or bracket and frame member having slotted or loose connection therewith so as to allow considerable angular adjustment. One or more adjusting or holding bolts may be connected with the contact plate or bracket and two bolts are preferably used, one on each side of the attacher bolt, so that adjusting engagement with the frame can thus be secured at two separated points and the bracket and connected buffer member adjusted and held rigidly in the desired angular position. One convenient form of arranging these adjusting or holding bolts is to form apertures such as 23 which are preferably of square or other non-circular shape in the flanges or lugs 7, 7' which may be bent up on the upper and lower edges of the contact plate 21 which preferably has substantially flat engagement with the frame web. These holding bolts 13 may advantageously have a corresponding non-circular or aligning body to engage these non-circular apertures while the threaded stem 8 of the bolt may extend through another round or other aperture in the opposite flange. Tightening nuts 12 and lock washers 24, if desired, may thus tighten either one of these adjusting bolts so as to force its contact portion or hook end 14 into engagement with the frame member, preferably that part of the frame flange which is adjacent the web. In this way, as indicated in Fig. 2, tightening either one of these adjusting bolts and correspondingly loosening the other, preferably when the angle bolt or other attacher 15 is somewhat loose, makes it possible to swing the buffer front and connected buffer supporting members 4 into any desired angle possible as, for instance, swinging them down from the dotted line into the full line position shown in Fig. 2. When this desired angular position is secured the attacher devices may be tightened so that the buffer will thereupon be held securely in this desired adjusted position.

One or more holes such as 19 may be formed in each of the contact brackets so that, if desired, the attacher bolt may support the bracket at different heights, and for many purposes it is desirable, where a single hole is used, to have this arranged in off-centre position so as to be somewhat away from the centre line of the bracket so that the two flanges are different distances from this hole as is shown in Fig. 4. In this way the contact bracket may be put on in either position so that its centre may be somewhat below the centre line of the angle bolt attacher as indicated in Fig. 3, while if the contact bracket was in its reversed or raised position it could be raised in this way a half or three-quarters of an inch or so from its lower position indicated. Where this bracket is made reversible, with one or more such off-centre attaching holes, it is desirable to have all the flange apertures, such as 23, given the same square or other non-circular contour so that the square body of the holding bolts may properly engage them, the bolt stems being preferably of about the same outer diameter as the thickness of these square bolt bodies so as to fit fairly tightly within these square holes. These contact brackets may be conveniently made of sheet steel or other metal, a quarter of an inch or so thick, and may be punched out of sheet metal and then bent up into the desired shape, preferably leaving one or both of the flanges, such as 7, in slightly oblique position with respect to the contact plate 21, so that when the holding bolts are tightened these flanges may be forced inward more or less to engage the edges of the end 5 of the buffer supporting strip or member. The holding bolts may be advantageously formed of tempered spring steel stock of about one-half inch square section and the hook ends or contact portions 14 may be bent over into somewhat inwardly projecting position, as indicated in Fig. 3 so as to have firm holding contact with the frame flange adjacent its web. When these bolts are tightened up the off-centre contact of the hook end of each bolt tends to force the body of the bolt into engagement with the outer side of the aperture 23 in the lower flange 7', as indicated in Fig. 3, and at the same time force or spring the central portion of the bolt body 13 inward into resilient engagement with the outer face of the buffer supporting member 5, which may be engaged adjacent its centre by the bolt body, or further up by the bolt stem in some cases. This action of the resilient holding bolts promotes the tight and strong holding action of the attaching devices and also minimizes rattle under running conditions of the automobile. It is also evident that a minimum lateral projection of the attaching device beyond the frame web is effected and, if desired, the stem 15 of the angle bolt attacher, which may be of one-half or five-eighths inch tempered spring steel, may be so short as to be even inside the flanges or lugs of the contact bracket.

This invention has been described in connection with a number of embodiments, forms, proportions, parts, arrangements, materials, methods of manufacture, connection and use, to the details of which disclosure the invention is not of course to be limited, since what is claimed as new and what is desired to be secured by Letters Patent is set forth in the appended claims.

1. In automobile buffers, an automobile having flanged frame members provided with frame apertures, mud guards and a splash pan secured to said frame members, a buffer having rearwardly extending supporting members adapted to co-operate with the frame members on both sides of said automobile and formed with attaching apertures, contact brackets formed with attaching apertures and apertured flanges adapted to extend around said buffer supporting members, angle bolt attachers having projecting retainers and threaded aligning stems extending through said frame apertures and attaching apertures, tightening means co-operating with said stems to hold said contact brackets and buffer supporting members against said frame members, and resilient adjusting bolts extending through the apertured flanges in said brackets on each side of said attachers and having hook ends engaging the lower flanges of said frame members adjacent the webs thereof and angularly adjust and hold said buffer supporting members with respect to the automobile frame members.

2. In automobile buffers, an automobile having flanged frame members provided with frame apertures, mud guards and a splash pan secured to said frame members, a buffer having rearwardly extending supporting members adapted to co-operate with the frame members on both sides of said automobile and formed with attaching apertures, contact brackets formed with attaching apertures and apertured flanges adapted to extend around said buffer supporting members, attachers having threaded stems extending through said frame apertures and attaching apertures, tightening means co-operating with said stems to hold said contact brackets and buffer supporting members against said frame members, and adjusting bolts extending through the apertured flanges in said brackets on each side of said attachers and engaging the lower flanges of said frame members adjacent the webs thereof and angularly adjust and hold said buffer supporting members with respect to the automobile frame members.

3. In automobile buffers, an automobile having flanged frame members provided with frame apertures, a buffer having supporting members adapted to co-operate with the frame members on both sides of said automobile and formed with attaching apertures, contact members formed with attaching apertures, attachers having threaded stems extending through said frame apertures and attaching apertures, and bolts engaging said contact members and said frame members to angularly adjust and hold said buffer supporting members and contact members against the webs of said automobile frame members.

4. In automobile buffers, an automobile having frame members provided with frame apertures, a buffer having supporting members adapted to co-operate with the frame members on both sides of said automobile, contact members formed with attaching apertures, attachers having stems extending through said frame apertures and attaching apertures, and bolts engaging said frame members to hold said buffer supporting members against the webs of said automobile frame members.

5. In automobile buffers, an automobile having flanged frame members provided with frame apertures and a splash pan secured to said frame members, a buffer having supporting members adapted to co-operate with the frame members on both sides of said automobile and formed with attaching apertures, contact brackets formed with attaching apertures and gripping flanges adapted to extend around said buffer supporting members, angle bolt attachers having threaded aligning stems extending through said frame apertures and attaching apertures, to hold said contact brackets and buffer supporting members against said frame members and adjusting bolts engaging said brackets on each side of said attachers and to hold said buffer supporting members with respect to the automobile frame members.

6. In automobile buffers, an automobile having flanged frame members provided with frame apertures and a splash pan secured to said frame members, a buffer having supporting members adapted to co-operate with the frame members on both sides of said automobile, contact brackets formed with attaching apertures and flanges adapted to extend around said buffer supporting members, bolt attachers having threaded aligning stems extending through said frame apertures and attaching apertures, to hold said contact brackets and buffer supporting members against said frame members and bolts engaging said brackets on each side of said attachers and to hold said buffer supporting members with respect to the automobile frame members.

7. In attaching devices adapted for use in attaching an automobile buffer to an automobile having flanged frame members formed with frame apertures and connected splash pan and mud guard portions, a contact bracket having flanges on each side of the same and formed with non-circular apertures and having an attaching aperture formed in laterally displaced position in the web of said bracket so as to be nearer one flange than the other, an angle bolt attacher having stem adapted to pass through one of said frame apertures and through the attaching hole in said bracket to secure a buffer supporting member thereto and a plurality of adjusting bolts having non-circular portions adapted to co-operate with the apertures in the flanges of said contact bracket and having contact ends to engage said frame members and simultaneously force the body of the bolt against the exposed side of the automobile supporting member.

8. In attaching devices adapted for use in attaching an automobile buffer to an automobile having flanged frame members formed with frame apertures and connected splash pan and mud guard portions, a contact bracket having flanges on each side of the same and formed with non-circular apertures and having an attaching aperture formed in the web of said bracket, an angle bolt attacher having a stem adapted to pass through one of said frame apertures and through the attaching hole in said bracket to secure a buffer supporting member thereto and a plurality of adjusting bolts adapted to co-operate with the apertures in the flanges of said contact bracket and having contact ends to engage said frame members and simultaneously force the body of the bolt against the exposed side of the automobile supporting member.

9. In attaching devices adapted for use in attaching an automobile buffer to an automobile having flanged frame members and connected splash pan and mud guard portions, a contact bracket having a thin substantially flat contact plate adapted to be interposed between the web of one of said frame members and the spring strip supporting member of the automobile buffer and having flanges on each side of the same and formed with non-circular apertures and having an attaching aperture formed in the web of said bracket, and a plurality of adjusting bolts adapted to co-operate with the apertures in the flanges of said contact bracket and having contact ends to engage said frame members and simultaneously force the body of the bolt laterally toward the co-operating frame member web.

10. In attaching devices adapted for use in attaching an automobile buffer to an automobile having flanged frame members and connected splash pan and mud guard portions, a contact bracket having a thin contact plate adapted to be interposed between the web of one of said frame members and the spring strip supporting member of the automobile buffer and having flanges on each side of the same and formed with apertures and an adjusting bolt adapted to co-operate with the apertures in the flanges of said contact bracket and having contact ends to engage said frame members and simultaneously force the body of the bolt laterally toward the co-operating frame member.

11. In attaching devices adapted for use in attaching an automobile buffer to an automobile having flanged frame members and connected splash pan and mud guard portions, contact brackets having gripping flanges formed with non-circular apertures, bolt attachers having stems adapted to pass through the attaching holes in said brackets to secure buffer supporting members thereto, and a plurality of holding bolts adapted to co-operate with the apertures in the flanges of said contact brackets and having hook contact portions to engage said frame members.

12. In attaching devices adapted for use in attaching an automobile buffer to an automobile having flanged frame members, contact brackets having gripping flanges formed with apertures, bolt attachers having stems adapted to pass through the attaching holes in said brackets to secure buffer supporting members thereto, and a plurality of holding bolts adapted to co-operate with the apertures in the flanges of said contact brackets and having contact portions to engage said frame members.

13. In attaching devices adapted for use in attaching an automobile buffer to an automobile having flanged frame members and connected splash pan and mud guard portions, a one piece wrought metal contact bracket adapted to be swivelingly connected to the web of one of said frame members and having a thin substantially flat contact plate adapted to be interposed between the web of one of said frame members and the spring strip supporting member of the automobile buffer and having flanges bent up on each side of the same and formed with square flange apertures and adapted to accommodate and have substantial aligning engagement with a buffer supporting member and a plurality of spring steel holding bolts having square sectioned body portions adapted to co-operate with said flange apertures and having laterally projecting contact ends to engage said frame member and adjust and maintain the angular position of the automobile buffer with respect thereto.

14. In attaching devices adapted for use in attaching an automobile buffer to an automobile having flanged frame members and connected splash pan and mud guard portions, a contact bracket to be swivelingly connected to the web of one of said frame members and having flanges on each side of the same and formed with square flange apertures and adapted to accommodate and have substantial aligning engagement with a buffer supporting member and a plurality of holding bolts having square sectioned portions adapted to co-operate with said flange apertures and having laterally projecting contact ends to engage said frame member and adjust and maintain the angular position of the automobile buffer with respect thereto.

15. In attaching devices adapted for use in attaching an automobile buffer to an automobile having flanged frame members and connected splash pan and mud guard portions, a contact bracket adapted to be swivelingly connected to the web of one of said frame members and having a thin contact plate adapted to be interposed between the web of one of said frame members and the spring strip supporting member of the automobile buffer and having flanges on each side of the same and formed with non-circular flange apertures and adapted to have substantial aligning engagement with a buffer supporting member, and a plurality of holding bolts having non-circular portions adapted to co-operate with said flange apertures and having a laterally projecting hook contact end to engage said frame member and adjust and maintain the angular position of the automobile buffer with respect thereto.

16. In attaching devices adapted for use in attaching an automobile buffer to an automobile having flanged frame members and connected splash pan and mud guard portions, a contact bracket adapted to be connected to the web of one of said frame members and having a thin contact plate adapted to be interposed between the web of one of said frame members and the spring strip supporting member of the automobile buffer and having flanges on the same and formed with flange apertures and adapted to have substantial aligning engagement with a buffer supporting member, and a holding bolt having portions adapted to co-operate with said flange apertures and having a laterally projecting contact end to engage said frame member and adjust and maintain the angular position of the automobile buffer with respect thereto.

17. In attaching devices adapted for use in attaching an automobile buffer to an automobile having flanged frame members and connected splash pan and mud guard portions a contact plate adapted to be swivelingly connected to the web of one of said frame members and adapted to accommodate and have substantial aligning engagement with a buffer supporting member and a plurality of holding bolts adapted to co-operate with said plate and having a laterally projecting contact portion to engage said frame member and adjust and maintain the angular position of the automobile buffer with respect thereto.

18. In attaching devices adapted for use in attaching an automobile buffer to an automobile having flanged frame members and connected splash pan and mud guard portions a contact plate adapted to be connected to the web of one of said frame members and adapted to have substantial aligning engagement with a buffer supporting member and a holding bolt adapted to co-operate with said plate and having a contact portion to engage said frame member and adjust the angular position of the automobile buffer with respect thereto.

19. In attaching devices adapted for use in attaching an automobile buffer to an automobile having flanged frame members and connected splash pan and mud guard portions, a one piece wrought metal contact bracket having an attacher hole by which it is adapted to be swivelingly connected to the web of one of said frame members and having lateral projections on each side of the same and formed with square flange apertures and adapted to accommodate and have substantial aligning engagement with a buffer supporting member.

20. In attaching devices adapted for use in attaching an automobile buffer to an automobile having flanged frame members and connected splash pan and mud guard portions, a contact bracket having an attacher hole by which it is adapted to be swivelingly connected to the web of one of said frame members and having lateral projections on the same and formed with apertures and adapted to have substantial aligning engagement with a buffer supporting member.

21. In attaching devices adapted for use in attaching an automobile buffer to an automobile having flanged frame members and connected splash pan and mud guard portions, a reversible contact bracket having gripping flanges on each side of the same and formed with non-circular apertures and having an attaching aperture formed in laterally displaced position in the web of said bracket so as to be nearer one flange than the other.

22. In attaching devices adapted for use in attaching an automobile buffer to an automobile having flanged frame members and connected splash pan and mud guard portions, a reversible contact bracket having flanges on each side of the same and formed with apertures and having an attaching aperture formed in laterally displaced position in the web of said bracket so as to be nearer one flange than the other.

GEORGE ALBERT LYON.